June 4, 1963 S. W. BRESENOFF 3,092,305
PRECISION PRESSURE GENERATOR SYSTEM
Filed April 29, 1959 3 Sheets-Sheet 1

INVENTOR.
STANLEY W. BRESENOFF

BY Edward A. Sokolski

AGENT

INVENTOR.
STANLEY W. BRESENOFF

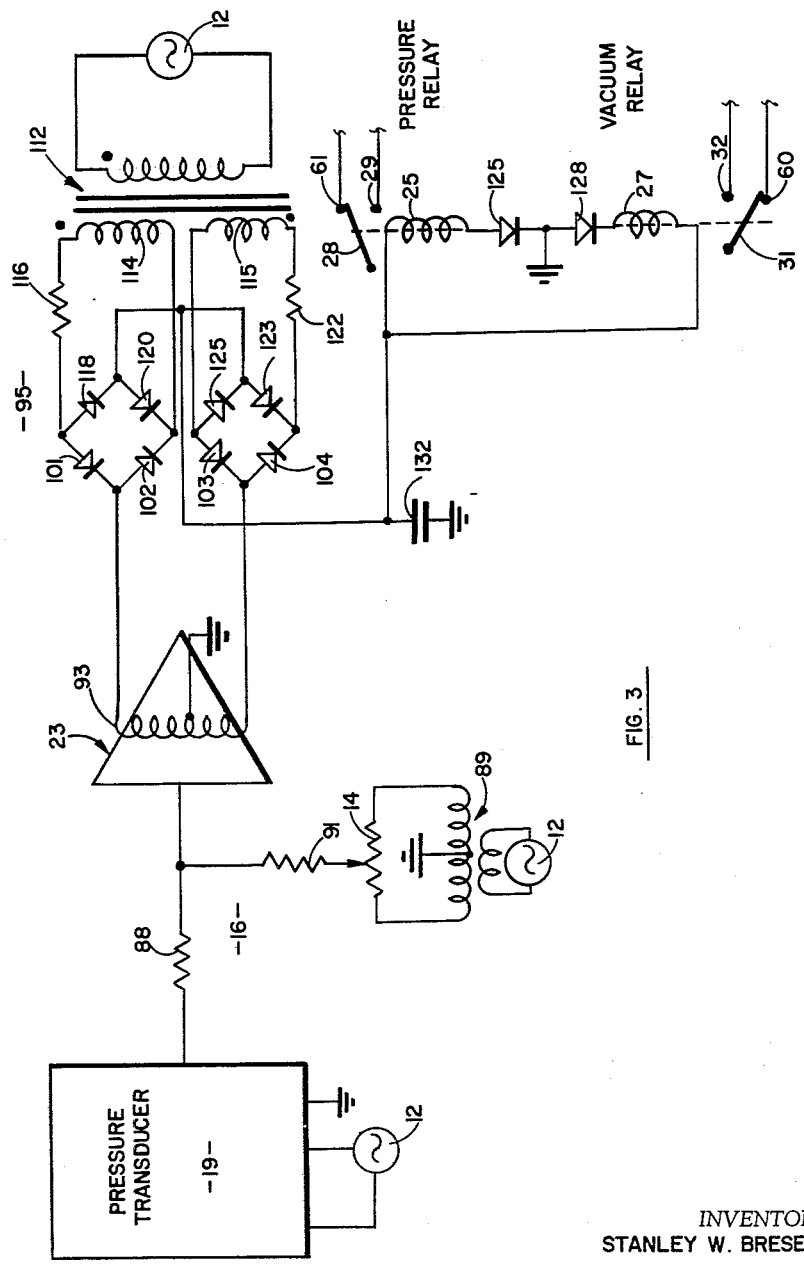

United States Patent Office 3,092,305
Patented June 4, 1963

3,092,305
PRECISION PRESSURE GENERATOR SYSTEM
Stanley W. Bresenoff, Garden Grove, Calif., assignor to North American Aviation, Inc.
Filed Apr. 29, 1959, Ser. No. 809,697
7 Claims. (Cl. 230—2)

This invention relates to a precision pressure generator system and more particularly to a device for generating a precision pressure in response to an electrical input signal.

In simulating flight conditions and in testing airborne equipment, it is often desirable to generate a precise pressure signal in response to an electrical input. Most of the devices now in use to generate such a pressure signal operate on the basis of a pressure bleed system. In such a system, generally, a pressure differential is created by flow from a pressure pump to a vacuum pump; and by means of a servo control needle valve or other pressure restrictor, the desired pressure output is tapped off the pressure flow. Such systems are relatively inefficient due to the fact that only a portion of the pressure signal generated is actually utilized in the output. Due to this inefficiency, relatively large pressure generating components are required for a given pressure output requirement. The device of this invention requires no bleed pressure, thereby allowing a substantial reduction in the size of the pump required. Only vacuum or pressure is required at any instant in the device of this invention and therefore only one pump operating as either a vacuum or a pressure pump (as automatically determined by the system) need be used at any one time. The generally used servo driven needle valve, cam valve, or similar device is eliminated and replaced by a servo driven pump which may be a gear pump.

While the illustrated embodiment is specifically adapted to generate pneumatic pressures, the general principles herein disclosed are readily adaptable in the construction of similar devices for generating other types of fluid pressures.

The device of this invention is capable of producing a pressure output which simulates a constant rate of descent over the normal full aircraft altitude range, a result which has been difficult or impossible to accomplish with other existing devices.

The device of this invention utilizes two modes of operation to reach the desired pressure. One of these modes may be called a coarse control mode while the other of these modes may be called a fine control mode. The coarse control mode is in operation when there are relatively large pressure errors (in excess of a predetermined minimum pressure). During the coarse control mode, a coarse control channel is operative, the output of a high pressure capability pump being fed directly into the output pressure line. When the pressure "error" is reduced below the predetermined minimum for coarse control, the system automatically is switched into the fine control mode. During the fine control mode, a fine control channel takes over, the pressure signal being generated by a servo driven low pressure capacity gear pump which is capable of accurate and efficient operation over a small differential pressure range, and whose rate of change of pressure is approximately proportional to its speed. The system thus uses a high pressure or vacuum capability pump which may, for example, be of the reciprocating piston type for generating relatively high pressures or vacuums and a pump which may be of the gear type which is capable of precisely controlled pressure or vacuum outputs but only over a low pressure or vacuum capacity range for low pressure or vacuum outputs. It is to be noted that pumps of the gear type provide a continuous rather than a pulsating output but due to their leakage characteristics are not suitable for generating large pressure outputs. The device of this invention thus uses the best features of an efficient high pressure capacity pump and an efficient low pressure capacity pump for generating a precision pressure output signal in response to an electrical input.

It is therefore an object of this invention to provide an improved device for generating a precisely controlled pressure signal in response to an electrical input.

It is a further object of this invention to improve the performance of static and dynamic pressure generation devices.

It is a still further object of this invention to provide an improved device for generating static and dynamic pressure signals utilizing coarse and fine control modes of operation.

It is a still further object of this invention to improve the efficiency of operation of precision pressure generators.

It is still another object of this invention to provide means for generating a more precise pneumatic pressure signal in response to an electrical input.

Other objects of this invention will become apparent from the following description taken in connection with other accompanying drawings in which FIG. 1 is a functional block diagram of the device of the invention;

FIG. 3 is a schematic diagram of pressure and vacuum relay control circuitry which may be used in the device of the invention.

Figure 1:
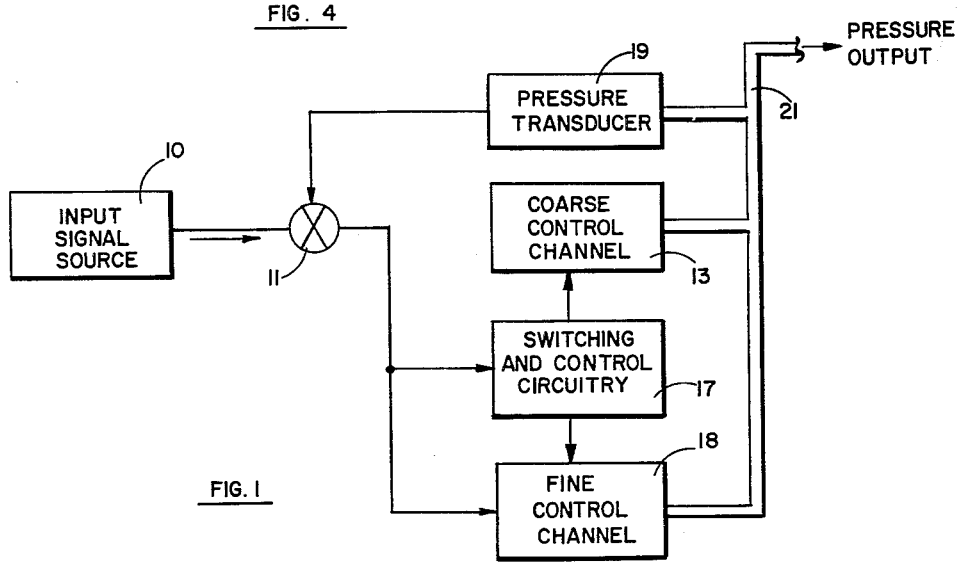

Referring to FIG. 1, a functional block diagram of the device of the invention is illustrated. An electrical signal corresponding to the desired output pressure is fed from input signal source 10 to difference deriving means 11. An electrical signal corresponding to the pneumatic output pressure signal in line 21 is generated by pressure transducer 19 and fed to difference deriving means 11. The electrical output signal from difference deriving means 11, which is the difference between the outputs of signal source 10 and pressure transducer 19, is fed to the switching and control circuitry 17 and fine control channel 18. Switching and control circuitry 17 amplifies the difference signal and alternatively either activates coarse control channel 13 or fine control channel 18. The details of the functioning of the switching and control circuitry 17 will be explained in detail further on in the specification. The basic function of this circuitry is to activate the coarse control channel if the difference signal from difference deriving means 11 is greater in magnitude than a predetermined minimum value, at the same time keeping fine control channel deactivated. On the other hand, if the input signal to switching and control circuitry 17 should fall below this predetermined minimum value, this circuitry will activate fine control channel 18, keeping coarse control channel 13 deactivated. It, thus, can be seen that either coarse control channel 13 or fine control channel 18 will operate at any one time depending on the magnitude of the input difference or error signal. The details of the functioning of the basic circuitry illustrated in FIG. 1 will be explained in detail further on in the specification.

Figure 2:
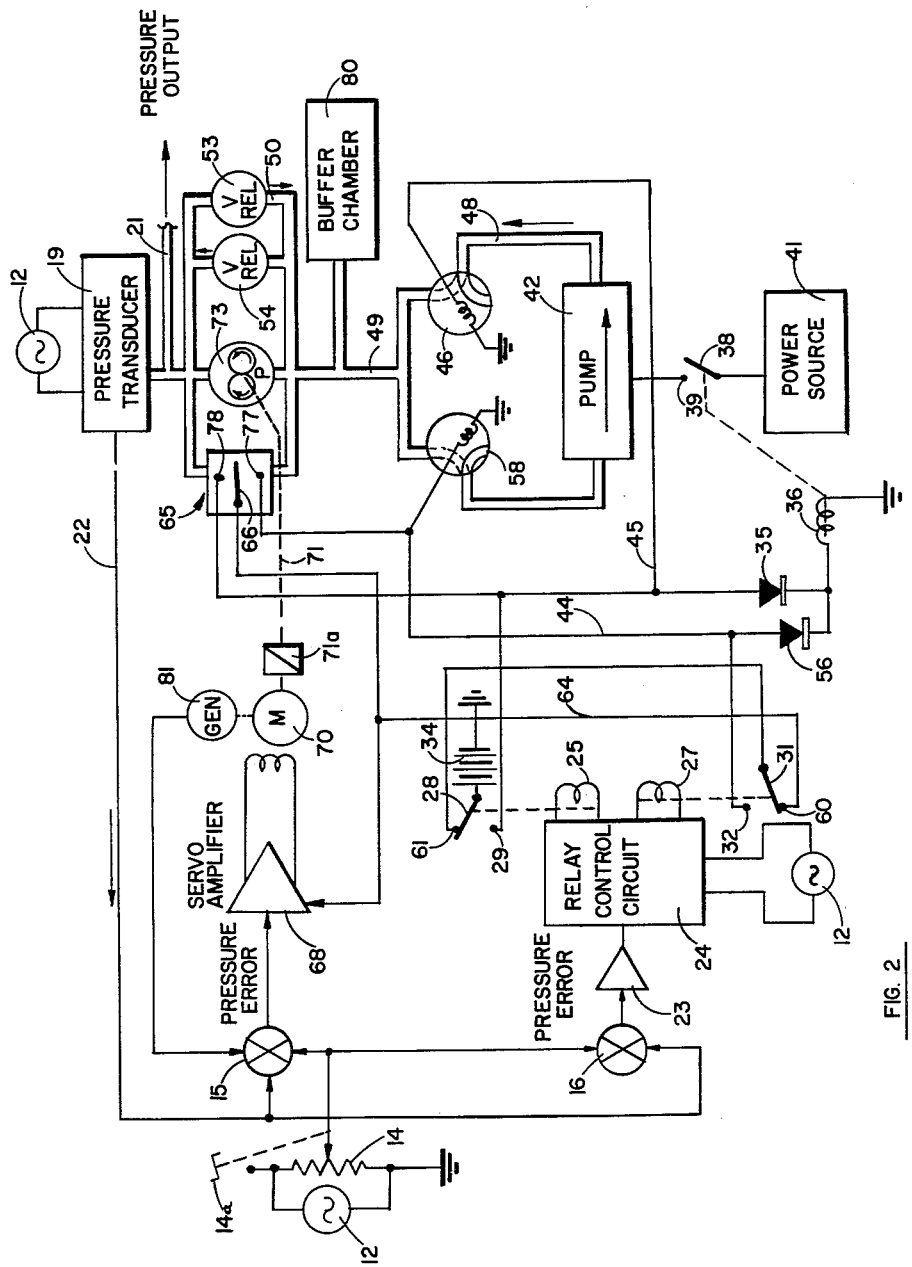
FIG. 2 is a functional schematic diagram of a preferred embodiment of the device of the invention.

The fine control and coarse control channels 18 and 13 and the other elements of the system in FIG. 1, are shown in more particularity in FIG. 2.

Referring to FIG. 2, and relating it to FIG. 1, it is to be initially noted that the combination of A.-C. excitation source 12 and potentiometer 14 of FIG. 2 correspond to the input signal source 10 of FIG. 1, and that signal difference deriving means 15 and 16 for providing signals to servo amplifier 68 and to relay control circuit 24 respectively correspond to (1) signal difference deriving means 11 of FIG. 1, and (2) the dual use of the single output therefrom for controlling fine control channel 18 and switching control device 17 (via amplifier 23) respectively. Hence, it is to be appreciated that the inputs to elements 68 and 23 of FIG. 2 correspond to the inputs to elements 18 and 17 respectively of FIG. 1.

Fine control channel 18 is thus seen to comprise the continuous proportional controller combination of servo amplifier 68, motor 70 (operatively coupled in driving relationship to positive displacement pump 73 by means of mechanical coupling element 71a) of FIG. 2. Included also is a closed loop speed control arrangement including tachometer or generator 81 and signal combining means 15 to provide more precise control of the pump motor as a function of the difference between the signals from potentiometer 14 and line 22. Hence, element 15 of FIG. 2 serves a dual function in providing the function of element 11 in FIG. 1 and in comprising a component of fine control channel 18 of FIG. 1.

Coarse control channel 13 is seen to comprise the combination of relay operated pump 42, power source 41, and transfer valves 48 and 58, of FIG. 2.

Coarse control channel 13, as well as fine control channel 18, is controlled by switching combination 17, which comprises: amplifier 23, relay control circuit 24, relay 36 and diodes 35 and 56, of FIG. 2. Differential pressure switch 65 is added as illustrated in FIG. 2 for the purpose of limiting the allowable pressure drop across pump 73, as will be more particularly explained hereinafter.

Referring to FIG. 2, a functional schematic diagram of a preferred embodiment of the invention is shown. An alternating current reference signal generated by source 12 is fed across the ends of potentiometer 14. It is to be noted that this same reference source 12 is used for pressure transducer 19 and relay control circuit 24. It is also to be noted that while an alternating current reference signal and a transducer having an alternating current output are shown for the preferred embodiment, a direct current transducer and reference signal may be utilized if desired. The arm of potentiometer 14 may be adjusted, as by knob 14a, to a position which will correspond to a desired pressure output. The arm of potentiometer 14 is connected to summing device 15 and also to summing device 16. Pressure transducer 19 is connected in the pressure output line 21 in which appears the desired output pressure. This pressure transducer may be of a type which will generate an alternating current output signal directly proportional to the pneumatic pressure signal passing through it, although if desired a transducer having a direct current output may be used in conjunction with a direct current reference signal. An electrical signal which is proportional to pressure is fed from pressure transducer 19 through line 22 to summing devices 15 and 16. The signals fed from potentiometer 14 and pressure transducer 19 should be connected to summing devices 15 and 16 so that they appear 180° out of phase with each other in these summing devices. This end result may be readily achieved, for example, by appropriately arranging the connections from power source 12 to the transducer and the potentiometer. Therefore, the outputs of summing devices 15 and 16 will represent the difference between the magnitudes of the outputs of potentiometer 14 and pressure transducer 19. These difference signals may either be in phase with the pressure transducer output or 180° out of phase with it depending on whether the signal from the pressure transducer 19 or the signal from potentiometer 14 is the greater.

Let us assume that the pressure difference as represented by the electrical output signals from summation devices 15 and 16 is representative of a pressure difference in excess of a predetermined minimum value, for example, 1" of mercury. The output of summation device 16 is fed to relay amplifier 23 where it is amplified and fed to relay control circuit 24 which is shown in detail in FIG. 3 and which will be explained in detail further on in the specification. The relay control circuit 24 detects the phase of the amplified difference signal thereby determining whether the output of pressure transducer 19 or that of potentiometer 14 is the greater. Depending on which is the case, either pressure relay 25 or vacuum relay 27 will be actuated either bringing contact 28 into engagement with contact 29 or contact 31 into engagement with contact 32. It is to be noted that pressure relay 25 and vacuum relay 27 are designed and adjusted so that neither one will be actuated unless the signal to either one exceeds a predetermined minimum value which corresponds to a predetermined minimum pressure difference (for example, 1" of mercury). Let us assume that the signal is such as to actuate the pressure relay 25 (i.e., the difference signal is 180° out of phase with the pressure transducer output). In such a case, power will be fed from power source 34 through closed contacts 28 and 29 and through diode 35 to actuate motor relay 36. With the actuation of motor relay 36 its contacts 38 and 39 will engage each other thereby feeding power from power source 41 to pump 42 which may be of the reciprocating piston type. At the same time, power will be fed through line 45 to the coil of pressure solenoid valve 46 thereby actuating this valve and allowing it to pass pneumatic pressure through the channel thereby established (as indicated by the dotted lines) air being drawn from the outside through vacuum solenoid valve 58 which remains in its illustrated deenergized position. A pressure output signal will therefore flow from the inlet provided by valve 58 through pump 42, lines 48, 49, 50 and one way relief valve 54 which is set to open at the minimum predetermined pressure difference signal (for example, 1" of mercury). This pressure output signal will pass through to pressure output line 21.

Let us assume now that the signal is such as to actuate vacuum relay 27, which will be the case if the output from pressure transducer 19 exceeds the desired pressure as represented by the setting of potentiometer 14, giving a difference signal in phase with the transducer output. The actuation of vacuum relay 27 will cause contacts 31 and 32 to engage. Power from power source 34 will therefore be fed through these contacts and diode 56 to motor relay 36. Similarly, therefore, as where the pressure relay was closed, power will be applied from power source 41 through contacts 38 and 39 to pump 42. However, in this instance, vacuum solenoid 58 will be actuated through power line 44 rather than the pressure solenoid which will remain in its illustrated deenergized position. This will provide a path from the pneumatic lines through the indicated dotted portion of the vacuum solenoid valve through the pump 42 and pressure solenoid valve 46 which now acts as an evacuation outlet. Therefore, the pressure line 21 is evacuated through one way relief valve 53, lines 50, 49, and 48, and the vacuum and pressure valves.

As soon as the pressure output line has been evacuated to the point where the difference signals from the summing devices 15 and 16 are less than the predetermined minimum difference, the vacuum relay will be deactuated bringing contact 31 into engagement with contact 60. The pressure relay not being actuated, contact 28 will engage contact 61. Therefore, power source 34 will be connected through both these sets of contacts and line 64 to servo amplifier 68 and contact 66 of pressure switch 65. Power source 34 supplies the B+ supply power to servo amplifier 68 without which the servo amplifier is inoperative. Therefore, with the application of power to servo amplifier 68, it will amplify the difference signal outputs from summing device 15. This difference signal as amplified by servo amplifier 68 is fed to reversible drive motor 70 which is mechanically coupled by gearing 71a and drive shaft 71 to gear pump 73.

Gear pump 73 will be driven in a direction which is dependent on the phase of the signal fed to motor 70. Therefore, if the signal from pressure transducer 19 exceeds the signal representing the desired pressure as fed from potentiometer 14, the gear pump will be driven in a direction to produce an evacuation of the pressure output line 21. On the other hand, if the desired pressure as represented by the output of potentiometer 14 exceeds the output of transducer 19, gear pump 73 will be driven in such a direction so as to produce an increased pressure output signal. Thereby, the gear pump will provide a fine correction to bring the pressure output precisely to the desired value. It is to be noted that with the pressure differential between lines 21 and 50 below the predetermined minimum (e.g., 1″ of mercury), relief valves 53 and 54 will be closed so that the gear pump 73 will not be by-passed.

Pressure switch 65 provides a rapid response means for maintaining the pressure differential across gear pump 73 at a value less than the predetermined maximum pressure for fine control operation which may be 1″ of mercury. If a pressure differential exists across pressure switch 65 in excess of the predetermined minimum value due to the pressure in line 50 exceeding that in line 21, contact 66 will be caused to engage contact 77, by means to be explained later, thereby connecting power from line 64 through the switch contacts to the solenoid of vacuum solenoid valve 58 and at the same time activating pump 42 by providing power through diode 56 to motor relay 36. The pump 42 will evacuate air from lines 48, 49, and 50 and buffer chamber 80 until this pressure differential is decreased below the maximum predetermined value at which time pressure switch 65 will automatically break the contact between contacts 66 and 77. On the other hand, if there is a pressure differential across the switch 65 in excess of the predetermined maximum due to the pressure in line 21 exceeding that in line 50, contact 66 will engage contact 78 providing actuation for the pressure solenoid valve 46 and the pump 42 thereby effecting an increase in pressure in lines 48, 59, and 50 and buffer chamber 80. In this manner, the pressure differential across the gear pump is kept small, resulting in a rate of change of the instantaneous pressure in the output line 21 approximately proportional to the rate of pump rotation. This relationship is obvious from thermodynamic relationships. Buffer chamber 80 is utilized to absorb pressure surges and thereby acts as a damper to even out the pressure output. It is to be noted that a pressure transducer having an electrical output proportional to the pressure differential across gear pump 73 can be used in place of pressure switch 65. The output of such a transducer can be amplified and fed to drive pump 42 at a rate and in a direction proportional to the pressure differential.

Negative feedback is provided from the output of the servo system to its input by means of tachometer generator 81 which is mechanically coupled to motor 70 and whose electrically generated signal is fed to summing device 15. Such negative feedback tends to linearize the response of the servo system. It is to be noted that tachometer 81 may be eliminated (at the sacrifice of some degree of precision) and the functions of summing devices 15 and 16 combined in a single summing device.

Referring now to FIG. 3, a schematic diagram of a relay control circuit 24 which may be used in the device of this invention is illustrated as connected to its associated circuitry. The signal generated in pressure transducer 19 is fed through summing resistor 88 to the input of relay amplifier 23. A reference signal, generated by alternating current source 12 is fed through transformer 89 across pressure setting potentiometer 14. Potentiometer 14 as previously mentioned is used to set the pressure desired in the output. An alternating current signal is fed from the arm of potentiometer 14 through summing resistor 91 to the input of relay amplifier 23. Summing resistors 88 and 91 comprise summing device 16 illustrated in FIG. 2. The voltage input from summing resistor 91 should be 180° out of phase with that from summing resistor 88. This end can be accomplished by appropriately connecting the leads of power source 12 to transformer 89. The amplified alternating current is fed from output winding 93 of servo amplifier 23 to bridge rectifier circuit 95 which serves as a phase sensitive detector. One end of winding 93 is connected to a junction between diodes 101 and 102 while the bottom end of winding 93 is connected to the junction between diodes 103 and 104. A reference signal is fed from alternating current power source 12 to the primary winding of transformer 112. It is to be noted that reference source 12 is commonly used to supply phase synchronized power to pressure transducer 19, potentiometer 14 and transformer 112. The top end of secondary winding 114 of transformer 112 is connected through resistor 116 to the junction between diodes 101 and 118 while the bottom end of this transformer winding is connected to the junction between diodes 102 and 120. The bottom end of secondary winding 115 which is in phase with the top end of winding 114 is connected through resistor 122 to the junction between diodes 104 and 123 while the top end of this transformer winding is connected to the junction between diodes 103 and 125. The junction between diodes 118 and 120 and 123 and 125 are connected together. In effect we have two bridge rectifiers operating in push pull configuration to give us an output at all times indicative of the phase relationship between the reference voltages applied from windings 114 and 115 and the signal voltage applied from winding 93. If the voltage from winding 93 as applied to the junction between diodes 101 and 102 is in phase with the voltage applied at the junction of diode 101 and 118 there will be a conventional current flow from the top of winding 93 during the positive half cycles of the input signals from winding 93 through diode 102, winding 114, resistor 116, diode 118 and the pressure relay winding 25 through diode 125 to ground. During the next half cycle, a similar current flow will occur from the bottom end of winding 93 through diode 104, resistor 122, winding 115, diode 125 and pressure relay 25 and diode 125 to ground. Thus, if the signals as applied from windings 114 and 93 are in phase with each other, the pressure relay 25 will be actuated. On the other hand, if these signals are 180° out of phase with each other there will be a negative or electron current flow through diodes 101 and 120 which will pass through vacuum relay 27 and diode 128 to ground. On the next helf cycle, there will be a similar electron current flow through diodes 125 and 123 through pressure relay 27 and diode 128 to ground. Thus, it can be seen depending upon whether the output signal from the pressure transducer 19 or the pressure setting potentiometer is the greater, the phase relationship between the voltage from winding 93 and the input reference source 110 will be such as to either actuate pressure relay 25 or vacuum relay 27 with its incident result as explained in connection with FIG. 2. Capacitor 132 is used as a ripple filter.

Figure 4:
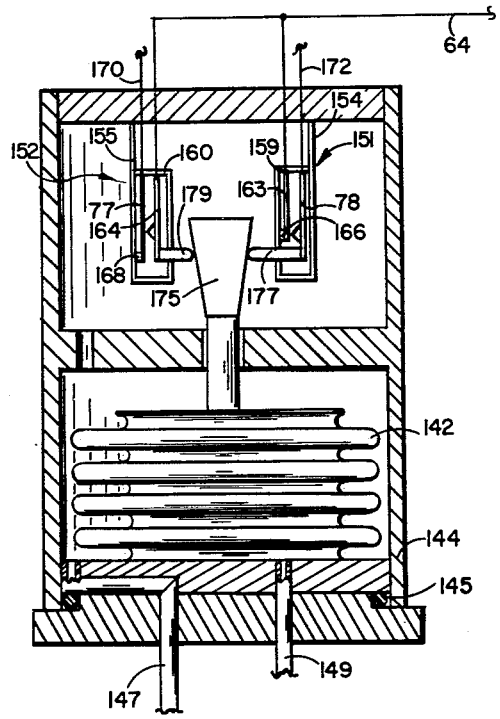
FIG. 4 is an elevation cross-sectional view of a pressure switch which may be utilized in the device of the invention.

Referring now to FIG. 4, an elevation cross-sectional view of an exemplary form of pressure switch 65 which may be utilized with the device of this invention is illustrated. An air bellows 142 is fixedly mounted within a case 144. Case 144 should be made air tight by means of appropriate sealing devices such as, for example, O ring 145. Pneumatic line 147 may be attached to the pressure output line 21 from gear pump 73 (see FIG. 2) while pneumatic line 149 may be attached to line 50 on the other side of gear pump 73. Two similar leaf spring switches 151 and 152 are fixedly attached to case 144 by means of support brackets 154 and 155 respectively. Switches 151 and 152 each have respective contact plates 78 and 164 which are fixedly attached at one end thereof to their respective switch cases 159 and 160. Each of these switches has respective second contacts 163 and 77 which are fixedly attached to their respective cases 159 and 160 at both ends, the bottom ends being cemented to the cases through respective insulating tabs 166 and 168. Switch contacts 77, 78, 163, and 164 should be electrically insulated from their cases. Switch contacts 163 and 164 are both connected to output lead 64 while switch contact 77 is fed to output lead 170 and switch contact 78 to output lead 172. Actuator 175 which has a wedge shaped head may be fixedly attached to bellows 142. Cam 177 which slides against the top portion of actuator 175 is fixedly attached to contact 78 of switch 151. Cam 179 which is fixedly attached to contact 164 of switch 152 slides against the opposite side of the top of actuator 175.

The device operates as follows: If the pneumatic pressure in line 147 is equal to the pneumatic pressure in line 149 the bellows 142 assumes a predetermined resting point. Under such conditions, the switches 151 and 152 are arranged so that their switch contacts are both open. If the pressure in line 147 should rise a predetermined amount above that in line 149, the bellows 142 will contract thereby pulling actuator 175 down a sufficient amount to move contact 164 into engagement with contact 77, at the same time pushing contacts 78 and 163 further apart. The closing of switch 152 as previously explained in reference to FIG. 2, where contacts 66 and 77 represent the switch contacts, will cause the system to generate a signal tending to reduce this pressure differential to zero.

On the other hand, if the pressure in line 149 exceeds that in 147 by a predetermined amount, bellows 142 will expand, causing actuator 175 to rise sufficiently to break the contact between switch contacts 77 and 164 in switch 152 and cause switch contacts 163 and 78 in switch 151 to engage. Similarly to the situation for the engagement of the switch contacts of 152 the engagement of the contacts of switch 151 will cause the generation of a pneumatic signal which will reduce the pressure differential across the pressure switch to below the predetermined minimum value. The pressure switch illustrated in FIG. 4 is only one of many that may be used for this purpose and is shown for exemplary purposes only.

Typical components which may be used in the device of this invention although not necessarily the only ones that can be so used might be for example:

Pressure transducer 19__ Model DP742, Northam Transducer Company, Santa Ana, California
Solenoid valves 46, 58___ Type 100–670–1, Great Lakes Mfg. Corporation, Cleveland, Ohio
Pump 42_____ Type 100–797, Great Lakes Mfg. Corporation, Cleveland, Ohio
Relief valves 53, 54_____ Type 101–037, Great Lakes Mfg. Corporation, Cleveland, Ohio
Gear pump 73_____ Type 101–035, Great Lakes Mfg. Corporation, Cleveland, Ohio It thus can be seen that the device of this invention provides efficient means for providing a precise pneumatic pressure output in response to an electrical input signal.

While the invention has been described and illustrated in detail, it is to be clearly understood that the same is by way of illustration and example only and is not to be taken by way of limitation, the spirit and scope of this invention being limited only by the terms of the appended claims.

I claim:

1. A precision pressure generator system for generating a pneumatic output pressure in response to an electrical input signal comprising first means for generating an electrical input signal, second means responsive to said output pressure for generating an electrical signal corresponding to the output pressure of said system, third means responsively connected to said first and second means for deriving the difference between said electrical input signal and said signal corresponding to the output pressure of said system, a course control pressure channel, a fine control pressure channel, said fine control pressure channel being connected to receive the output of said difference deriving means, switch means responsively connected to said third means for alternatively activating said coarse control pressure channel or said fine control pressure channel, said switch means being connected between said channels and said difference deriving means to alternatively activate said coarse control channel in response to outputs from said difference deriving means greater in magnitude than a predetermined minimum value or said fine control channel in response to outputs from said difference deriving means less in magnitude than said predetermined minimum value, and an output line, the outputs of said fine and coarse control pressure channels being fed to said output line.

2. In a pneumatic pressure generator system, means for generating an electrical signal corresponding to a desired pressure output, an electrical pressure transducer connected to measure the pneumatic output of said system, first and second summing devices, the outputs of said signal generating means and said transducer being fed in phase opposition relationship to each said summing devices, a servo motor, the output of said first summing device being fed to said servo motor, a vacuum and a pressure relay connected in circuit with said second summing device, said vacuum relay being responsive only to one predetermined phase of output signal of a predetermined minimum amplitude or greater from said summing device, said pressure relay being operative in response only to outputs from said summing device of said predetermined minimum amplitude or greater and of a phase opposite to said one predetermined phase, vacuum and pressure solenoid valves responsively connected respectively to said vacuum and pressure relays, a pump responsively connected to said relays, pneumatic output lines connected in pneumatic circuit with said solenoid valves and said pump, and a gear pump connected to receive the mechanical output of said servo-motor, said gear pump being connected in pneumatic circuit with said pneumatic output lines, the activation of said servo-motor being controlled by said vacuum and pressure relays, said servo-motor only being activated when the signal from said second summing device is less than said predetermined amplitude.

3. In a pneumatic pressure generator system, means for generating an electrical signal corresponding to a desired pressure output, an electrical pressure transducer connected in series with the pneumatic output of said system, first and second summing devices, the outputs of said signal generating means and said transducer being fed in phase opposition relationship to each said summing devices, a servo-motor, the output of said first summing device being fed to said servo-motor, an amplifier, the output of said second summing device being fed to said amplifier, a phase detector connected to receive the output of said amplifier, a vacuum and a pressure relay connected to receive the output of said phase detector, said vacuum relay being responsive only to one predetermined polarity of output signal of a predetermined minimum amplitude or greater from said phase detector, said pressure relay being responsive only to outputs from said phase detector of said predetermined minimum amplitude or greater opposite in polarity to said one predetermined polarity, vacuum and pressure solenoid-valves responsively connected respectively to said vacuum and pressure relays, a pump responsively connected to said relays, pneumatic output lines connected in pneumatic circuit with said solenoid-valves and said pump, and a gear pump connected to receive the mechanical output of said servo-motor, said gear pump being connected in pneumatic circuit with said pneumatic output lines, the activation of said servo motor being controlled by said vacuum and pressure relays, said servo-motor only being activated when the signal from said phase detector is less than said predetermined amplitude.

4. The device as recited in claim 3 and additionally comprising a pneumatic pressure controlled switch having pneumatic input lines, said input lines being connected across said gear pump, said pressure switch being responsive to pressure differentials across said gear pump in excess of a predetermined magnitude, the switch contacts of said switch being connected in electrical circuit with the solenoids of said vacuum and pressure solenoid-valves and said pressure pump, whereby the pressure differential across said gear pump will be reduced to below said predetermined magnitude.

5. A precision pressure generator system comprising an output line, first and second pumps, means providing fluid communication between each pump and said output line, a source of input signal indicative of a desired pressure reference, means responsively connected to said output line for generating an output signal proportional to the pressure in said output line, means responsively connected to said source of input signal and said output signal means for generating an error signal having a magnitude and polarity indicative of the difference between said input signal and said output signal, and control means interconnected between said error signal generator and each of said first and second pumps and responsive to the magnitude and polarity of said error signal for alternatively operating, each to the exclusion of the other, said first pump in response to error signals greater than a pre-determined magnitude and said second pump in response to error signals less than said pre-determined magnitude, whereby the error signal is reduced to a minimum.

6. The device as recited in claim 5 and additionally comprising pressure sensitive means responsively connected across said second pump and including said first pump for maintaining the pressure differential across said second pump at a value less than a predetermined value, and means including said error signal means in circuit with said pressure sensitive means for causing said pressure sensitive means to operate solely when said error signal is less than said preselected magnitude.

7. A precision pressure generator system for generating an output pressure in response to an electrical input signal, comprising: first means responsive to the output pressure of said system for generating an electrical signal corresponding to the output pressure of said system; second means for providing an electrical signal input source; third means responsively connected to said first and second means for deriving an error signal indicative of the difference between said electrical input signal and said electrical signal corresponding to the output of said system; a coarse control pressure channel having an output and a fine control pressure channel having an output, said third means being coupled to said channels for alternatively activating said coarse control pressure channel or said fine control pressure channel; and an output line, the outputs of said fine and coarse control pressure channels being fed to said output line.

References Cited in the file of this patent

UNITED STATES PATENTS

| | | |
|---|---|---|
| 1,807,328 | Warren | May 26, 1931 |
| 2,652,188 | Cyr | Sept. 15, 1953 |
| 2,690,291 | Taylor | Sept. 28, 1954 |
| 2,707,249 | Schneider | Apr. 26, 1955 |
| 2,741,986 | Smith | Apr. 17, 1956 |
| 2,880,745 | Regan | Apr. 7, 1959 |
| 2,961,966 | Zillman et al. | Nov. 29, 1960 |